UNITED STATES PATENT OFFICE.

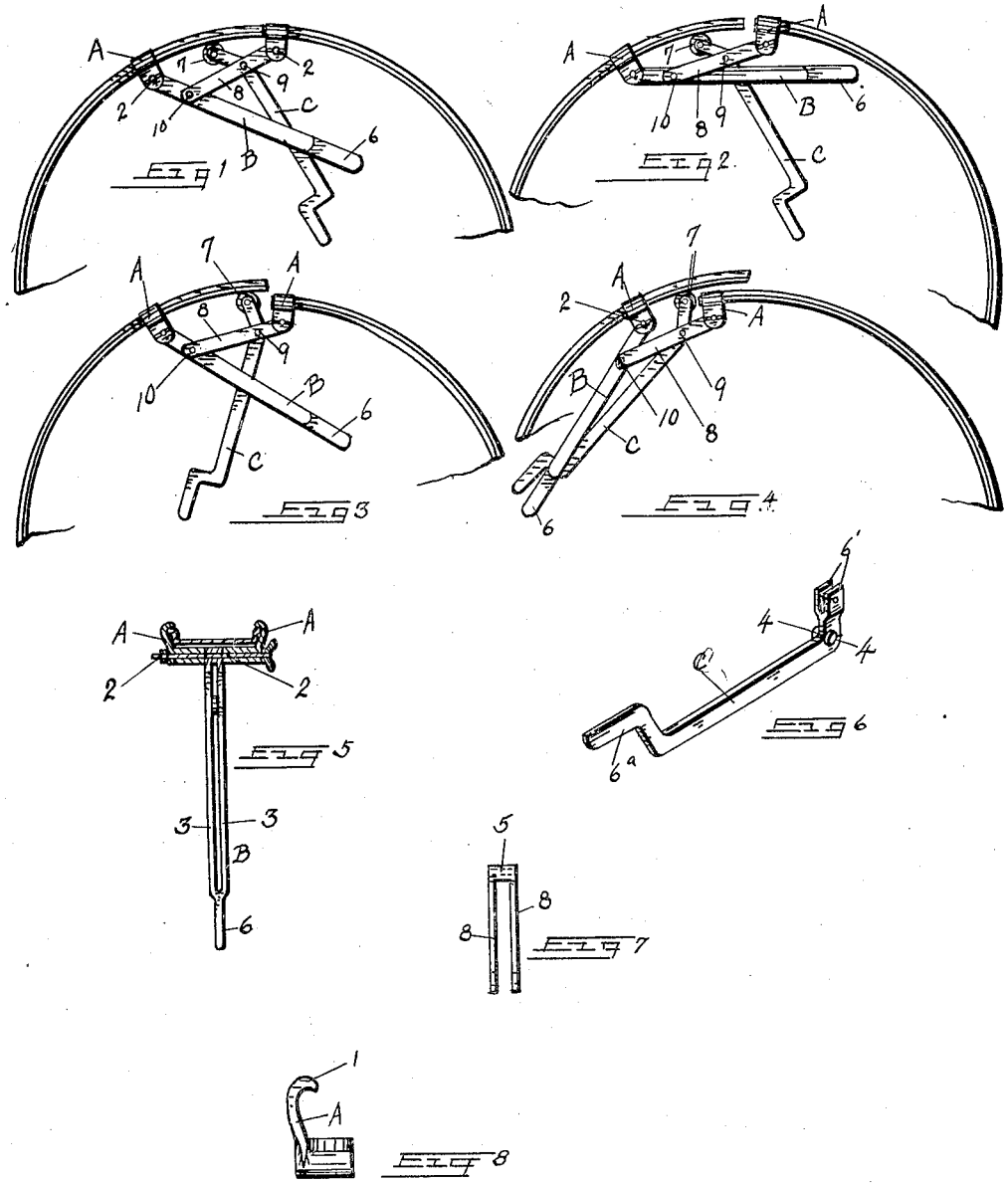

PETER R. PETERSON, OF SALT LAKE CITY, UTAH.

RIM-TOOL.

1,335,795.  Specification of Letters Patent.  Patented Apr. 6, 1920.

Application filed June 30, 1919. Serial No. 307,800.

*To all whom it may concern:*

Be it known that I, PETER R. PETERSON, a citizen of the United States, residing at Salt Lake City in the county of Salt Lake and State of Utah, have invented certain new and useful Improvements in Rim-Tools, of which the following is a specification.

My invention relates to rim removing tools, and has for its object to provide an efficient and economical tool by which the demountable rim of an automobile wheel may be removed from the tire easily and quickly.

This object I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a side elevation of a portion of the rim of a tire with my device in place thereon and ready to receive the first lever action. Fig. 2 is a side elevation of a portion of the rim showing my device after the first lever action. Fig. 3 is a side elevation of the rim showing my device thereon after the second lever action. Fig. 4 is a side elevation of the rim showing my device after the third lever action. Fig. 5 is a transverse section of the rim clamping portion of my device with one of the levers shown therewith in elevation. Fig. 6 is a detail view in perspective of another one of the levers. Fig. 7 is an edge plan view of the link connecting said levers. Fig. 8 is an enlarged plan view of one of the rim clamps.

I am aware that there have been many tools patented and some now on sale for quickly removing the rim from the tire of a wheel but as far as known to me none of them use the compound lever actions which may be had with my device, by which the abutting ends of the rim may be first separated, then one end moved radially inward, then the two ends thrown by each other to reduce the circumference of the rim and lock the rim in its reduced form for receiving another tire, and by again giving the lever actions backward to replace the rim in the second tire without possible injury to the tire.

The present invention consists of the rim clamps A each made of a flat metal piece having one end bent to form a rim-hook 1 and a hole is formed in the other end portion through which the clamp bolt 2 is passed. The said clamps A are to be used in pairs with opposed positions. A lever B is pivoted at one of its ends to one pair of said clamps. The said lever B consists of two parallel spaced apart flat bars, which bars are joined at each end and at an intermediate point where the rivet 10 is passed through them. A hole is provided through one end of said bars 3 through which hole one of the bolts 2 is passed and which bolt acts as a pivot pin to connect the said lever B with the said pair of clamps A. The other end of said bars 3 are held in spaced apart relation to each other by the integral hand piece 6. The shifting lever C is operated within the slotted space between said bars 3, and said lever C consists of a flat bar having one end portion bifurcated, as at 6′, and the other end portion, which is shown at 6ª, is offset to form the locking element by means of which my device may be locked when the two levers B and C are thrown nearest a parallel position. Two laterally projecting bosses 4 are integrally formed on said lever C, near a short bend therein, and through said bosses and said lever at that point, a hole is bored. A link element is provided connecting said levers B and C, which link element consists of the parallel link bars 8, which are integrally joined at one end by the boss 5. A hole is bored through said bars and boss 5 and another pair of said clamps A are pivoted on said link bars 8 by passing another one of said bolts 2 through said clamps and link bars. The said lever C is pivoted between the said link bars 8 by the pivot pin 9, which is passed through the hole in said lever C at the bosses 4. The other ends of said link bars 8 are pivoted to said bars 3 of said lever B, by the pivot pin 10 which is passed through said bars 3 and the end portions of said link bars 8.

The operation of my device is as follows:—

Desiring to remove the rim from a tire the device is secured in place within said rim by fastening a pair of the clamps A of my device adjacent the cut in the rim; then by throwing the shifting lever C to free the roller 7 from the inner face of the rim the other pair of clamps A may be fastened on said rim by setting the thumb nuts on the bolts 2 of said clamps. When both clamps are set rigidly on the rim the abutting ends of said rim may be separated by pressing the hand piece end of lever B away from the offset end of lever C, this action will tend to widen the space between the two pair of clamps A as shown in Fig. 2. When the abutting ends have thus been separated to brake any temporary setting of said abutting ends, the end of the rim held by the clamp A nearest the junction or cut may be shifted toward the axis of the rim by moving said lever C on its pivot pin 9, and bringing said roller 7 into contact with the inner face of the rim and rolling it along the inner face of the rim as shown in Fig. 2. When the rim ends have been so shifted a throw of the lever B on its pivot 10 will move the rim away from the tire and the rim will be held in the position shown in Fig. 4 by moving the hand piece end of said lever B onto the offset portion 6$^a$ of said lever C where by means of the shoulder or offset it will slightly engage and lock. The circumference of the rim is then much less than the circumference of the tire which is then free to be removed and the other tire placed around the rim. When the tire to be placed on the rim is properly located by its air valve being passed through the rim the said rim may be secured by pressing the lever C and releasing lever C from lever B; then by moving said levers in the reverse movements to that for removing the tire, that is move the lever B to position shown in Fig. 1, which will unlock the rim and lever C and bring the ends of the rim radially in line, then throw the lever C to the position shown in Fig. 1 when the ends of the rim will be in position for fastening and the rim securely held within the tire to receive the air inflation.

I have thus provided a novel compound set of levers which will spread the abutting ends of demountable rims, shift the said ends and temporarily reduce the circumference of the rim so that the tire may be easily and quickly removed and replaced by another tire.

Having thus described my invention I desire to secure by Letters Patent and claim:—

1. In a tire rim tool the combination of coacting clamps to detachably engage the rim adjacent the cut in said rim; a lever pivoted to one of said clamps; a link bar pivoted at one end to said lever and at the other end to the other of said clamps; another lever pivoted to said link bar and bifurcated at one end and offset near its other end; and a roller mounted for rotation in said bifurcated end of the last mentioned lever.

2. In a tire rim tool the combination of two pair of coacting clamps adapted to detachably engage the edges of a demountable rim on opposite sides of the cut in said rim; a lever having a longitudinal slot therein and pivoted to one of said clamps; a slotted link bar pivoted at the closed end to the other of said clamps and at the other end to said lever; another lever operable in the slot of the first mentioned lever and also operable in the slot in said link bar, and having two short bends therein; and a roller mounted in the end of the last mentioned lever.

In testimony whereof I have affixed my signature.

PETER R. PETERSON.